UNITED STATES PATENT OFFICE.

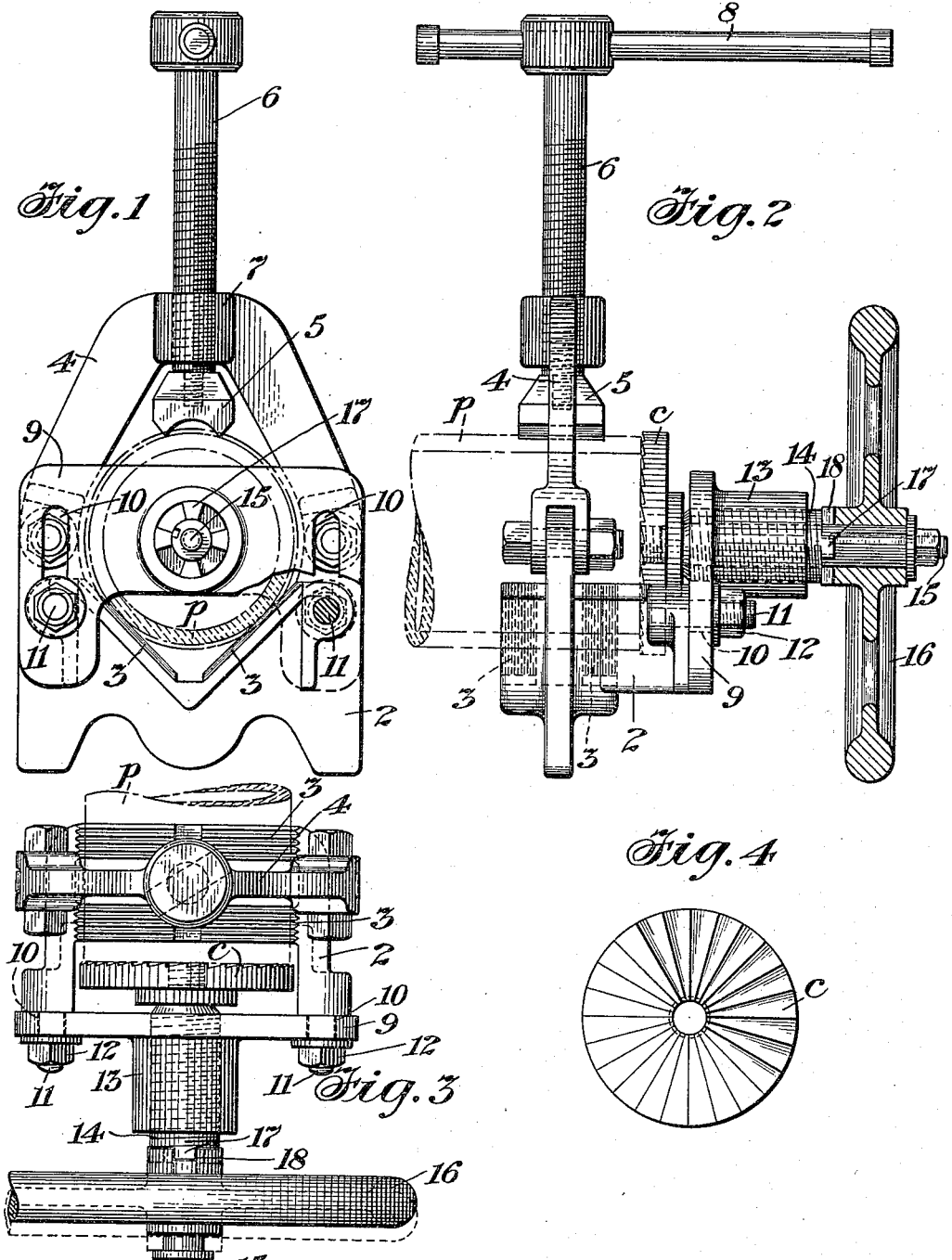

JOHN H. DEPPELER, OF JERSEY CITY, NEW JERSEY, ASSIGNOR TO GOLDSCHMIDT THERMIT COMPANY, OF NEW YORK, N. Y., A CORPORATION OF NEW YORK.

APPARATUS FOR FACING THE ENDS OF PIPES, &c.

1,168,060.  Specification of Letters Patent.  Patented Jan. 11, 1916.

Application filed July 10, 1913. Serial No. 778,293.

*To all whom it may concern:*

Be it known that I, JOHN H. DEPPELER, citizen of the United States, and resident of Jersey City, in the county of Hudson and State of New Jersey, have invented certain new and useful Apparatus for Facing the Ends of Pipes, &c., of which the following is a specification.

This invention relates to an apparatus for facing the ends of pipes, etc., and the main object of the invention is to provide an improved apparatus of this type especially adapted for attachment to pipes and like parts, by means of which the end of the work to be faced may be brought into the desired plane at a predetermined angle to the longitudinal axis of the work.

In welding pipes, bars, rails, girders, and other similar parts it is necessary to face the surfaces to be united to true planes and then bring them into exact parallelism. This is accomplished by means of facing tools or cutters, usually driven by hand, by means of which the facing tool may be turned to dress the end of the pipe or other part.

The present invention relates to such a facing apparatus, and the principal feature of the invention is the provision of a clamp attachable directly to the pipe or other part and carrying a facing tool mounted on the clamp in such a manner that it may be turned in a plane at the exact angle to which it is desired to bring the end of the work, and also fed in the direction of the longitudinal axis of the work.

Other features of the invention not hereinbefore referred to will be hereinafter described and claimed and are illustrated in the accompanying drawings, in which—

Figure 1 is an end view, partly broken away, of a facing apparatus embodying the invention; Fig. 2 is a sectional side elevation of the same; Fig. 3 is a plan view of the same in a slightly modified form, and Fig. 4 is a detail illustrating in elevation a facing tool suitable for use in the apparatus.

Similar characters designate like parts in all the figures of the drawings.

In the particular embodiment of the invention illustrated in the drawings I have shown the facing apparatus as embodying a suitable clamp for engaging the work, this clamp being illustrated as a pipe-clamp adapted to surround and engage the end of a pipe, such as $p$. This pipe-clamp comprises in the present case a main fixed element or body portion, 2, having suitable roughened gripping surfaces, 3, and to this main body portion is connected a yoke, such as 4, adapted to carry the movable element of the clamp. The gripping surfaces and the supporting portions of the fixed element 2 constitute the fixed jaw of this clamp, the movable jaw of which may be constructed substantially as shown at 5, it being of the type ordinarily employed in pipe-clamps and being mounted in this instance at one end of a threaded rod, 6, which passes through a threaded nut, 7, of the yoke 4 and is adapted to be adjusted up and down to release or grip the pipe $p$ or other part to be held. The threaded rod 6 may be turned in the usual manner, as by means of a bar, 8. These parts just described are sufficient for the purpose of inclosing and engaging one end of the pipe or other work to be held and locating it in a predetermined relation to the clamp and the other parts of the facing apparatus.

In the construction illustrated the fixed element or jaw of the pipe-clamp is of considerable length in order that it may present relatively long gripping surfaces 3 to engage the periphery of the work and also to furnish a suitable support for the facing tool proper. This facing tool is intended to be mounted in a bearing at one side of the central crosswise plane of the clamp and is also in the preferred construction adjustable crosswise of the work to bring its axis of movement into the proper position for coöperation with parts of various diameters. In order to provide for this adjustment it is mounted in a bearing carried by a cross-slide, 9, adjustable up and down transversely to the axis of the pipe $p$. This cross-slide has relatively long slots, 10, through which pass pins or bolts, 11, which in turn carry on their outer ends clamp nuts, 12, by means of which the slide may be securely clamped to the body portion 2 in any desired crosswise position. This slide has an internally bored sleeve, 13, into which is threaded the bearing proper for the facing tool. This bearing is indicated at 14 and is externally threaded to fit into and coöperate with the internal threads of the sleeve 13. It is intended to receive a suitable spindle, 15 to which is secured at the inner end of the spindle a facing tool, such for example as the cutter shown at 11.3 c. The parts just described are sufficient to permit the tool c to be turned about its axis by the spindle and at the same time fed forward toward the work to be dressed by the advance of the threaded bearing 14 toward the work. In order, however, that the parts may be operated readily suitable means will be employed for turning the spindle and this bearing. Here a hand-wheel is shown at 16 as splined on the spindle 15 and as having means for coupling it to the sleeve 13. The coupling means illustrated may be the ordinary clutch parts, that is to say, teeth, such as 17, on one of these parts adapted to be received in corresponding notches, 18, on the other. When the sleeve 13 and the hand-wheel 16 are coupled together in this manner the sleeve, as well as the spindle 15, will of course be rotated when the hand-wheel is turned, and in addition the sleeve will be fed toward the work. By this action the tool will not only be rotated but will also be advanced the desired extent at each rotation.

In Fig. 2 the construction shown is one in which the hand-wheel and the sleeve 13 are constantly coupled so that the sleeve will always be turned to advance the tool at each rotation of the hand-wheel.

In Fig. 3, however, which illustrates a modification of the construction, the spindle is extended sufficiently to permit the hand-wheel to slide on the spindle a distance sufficient to enable it to be coupled to or uncoupled from the sleeve 13, as desired, so that said sleeve may either be turned with the hand-wheel at each rotation thereof, or only coupled thereto at intervals and turned as often as it may be desired to impart feed movement to the tool.

Owing to the fact that the position of the bearing for the facing tool is adjustable, this tool can be shifted so that its center coincides with the center of the surface to be faced or is in any other suitable relation thereto.

While in the embodiment of the invention illustrated the tool is shown as arranged at an angle of ninety degrees to the axis of the work, it will be understood that this angle is not necessary in all cases but that it is possible to face the end of the work with an apparatus of this type at any desired angle.

What I claim is:

1. Apparatus for facing the ends of pipes, comprising a clamp for engaging the work, a facing tool for operating upon the end of the work, a spindle rotatably supporting said tool in the clamp, an externally-threaded sleeve co-axial with and loosely mounted on said spindle, said sleeve coöperating with an internally-threaded portion of the clamp and having a portion to contact with said tool, actuating means to rotate said rod to turn the same in the sleeve, and means automatically operable by axial shifting of said actuating means to connect said sleeve with said means so that the sleeve will rotate with the spindle to feed the tool forward.

2. In an apparatus for facing the ends of pipes, etc., the combination with a clamp for engaging the work, of a cross-slide adjustably connected at each end to said clamp whereby it may be adjusted transversely to the longitudinal axis of the work and having a threaded bore extending lengthwise of said axis, an externally threaded bearing fitting into and coöperating with said threaded bore, a spindle journaled in said bearing, a facing tool secured to said spindle, a driving wheel on said spindle for rotating the same, and coupling means between said spindle and sleeve for simultaneously turning and feeding said sleeve, said coupling means adapted to be automatically actuated by lateral movements of the wheel.

Signed at Jersey City in the county of Hudson and State of New Jersey this third day of July A. D. 1913.

JOHN H. DEPPELER.

Witnesses:
WM. GAMSBY,
LILLIAN ARMSTRONG.

Copies of this patent may be obtained for five cents each, by addressing the "Commissioner of Patents, Washington, D. C."